United States Patent [19]
De Vries

[11] Patent Number: 6,163,511
[45] Date of Patent: Dec. 19, 2000

[54] DEVICE FOR STORING AND SELECTIVELY PLAYING DISC-SHAPED INFORMATION CARRIER

[75] Inventor: Siebren De Vries, Haarlem, Netherlands

[73] Assignee: Chess Engineering B.V., Haarlem, Netherlands

[21] Appl. No.: 09/171,862

[22] PCT Filed: Apr. 16, 1997

[86] PCT No.: PCT/NL97/00199

§ 371 Date: Nov. 20, 1998

§ 102(e) Date: Nov. 20, 1998

[87] PCT Pub. No.: WO97/41559

PCT Pub. Date: Nov. 6, 1997

[30] Foreign Application Priority Data

Apr. 26, 1996 [NL] Netherlands ............................ 1002954

[51] Int. Cl.[7] .................................................. G11B 17/26
[52] U.S. Cl. .............................................. 369/37; 369/191
[58] Field of Search .................................. 369/33, 34, 36, 369/37, 178, 179, 191, 192; 360/98.04, 98.05, 98.06

[56] References Cited

U.S. PATENT DOCUMENTS

| | | | |
|---|---|---|---|
| 4,670,866 | 6/1987 | Hasegawa et al. | 369/36 |
| 4,901,172 | 2/1990 | Nakazawa et al. | 360/98.05 |
| 4,996,680 | 2/1991 | Starr | 369/37 |
| 5,022,020 | 6/1991 | Langman et al. | 369/37 |
| 5,027,335 | 6/1991 | Deis | 369/37 |
| 5,146,451 | 9/1992 | Kang | 369/270 |
| 5,541,896 | 7/1996 | Ashby | 369/37 |
| 5,541,897 | 7/1996 | Baca et al. | 369/37 |

FOREIGN PATENT DOCUMENTS

| | | |
|---|---|---|
| 0 722 168 | 7/1996 | European Pat. Off. . |
| 36 21 790 | 1/1988 | Germany . |
| 57-189372 | 11/1982 | Japan ...................... 369/37 |

OTHER PUBLICATIONS

"Optical Data Storage Library for Disks without Cartridges Shell", pp. 485–487, IBM Technical Disclosure Bulletin, vol. 37, No. 2B, Feb. 1, 1994.

*Primary Examiner*—David L. Ometz
*Attorney, Agent, or Firm*—Young & Thompson

[57] ABSTRACT

A device for storing and selectively playing disc-shaped information carriers includes a magazine for accommodating the information carriers in layers arranged around a virtual centerline. The information carriers leave open a central core of the magazine. A playing unit designed to receive a selected information carrier is directly accessible from this core. Transport devices are accommodated in the core at least during operation for holding or releasing a freely selectable information carrier and transporting it between an individual storage location and the playing unit.

7 Claims, 2 Drawing Sheets

DEVICE FOR STORING AND SELECTIVELY PLAYING DISC-SHAPED INFORMATION CARRIER

BACKGROUND OF THE INVENTION

The invention relates to a device for storing and selectively playing disc-shaped information carriers, comprising a magazine for accommodating the information carriers in layers arranged around a virtual centreline, a playing unit or units for receiving a selected information carrier, and controllable transport means for holding or releasing a freely selectable information carrier and transporting it between an individual storage location and the playing unit. The term "playing" should be given a wide interpretation within the scope of the invention such that it does not purely refer to playing in the usual sense of the word, information present on the information carrier being read out, but also to information being written onto the information carrier, which may or may not be blank at that moment.

Such a device may be used especially for the storage of information carriers having the CD format, comprising various types such as music CDs. CD-ROMs, CDR (ecordable)s, and CD-I(nteractive). Such a disc-shaped information carrier in itself is capable already of accommodating a large quantity of information, but it is insufficient for dealing with the vast amount of data as found in archives, libraries, and the like. If this medium is chosen for the storage of these data, the latter are inevitably to be spread over a large number of individual discs. The need then arises for an efficient storage of and an adequate access to the individual information carriers.

To provide for this, German Patent Application No. 36 21 790 describes a device of the kind mentioned in the opening paragraph which is often referred to as a (CD) jukebox or (CD) changer. This known device comprises a rectangular housing with four magazines for the storage of information carriers, such as magnetic tapes and optical or magnetic discs, which magazines are arranged in comers of this housing. The individual information carriers here lie in columns one above the other, said columns being arranged around a centreline of the magazine. The information carriers leave a free space on a diagonal of the housing, providing access to an intermediate space between the magazines where two playing units are positioned on either side of a primary manipulator which cooperates with a secondary manipulator in the core of a magazine so as to transport jointly a specific information carrier between its storage location and one of the playing units. The secondary manipulator for this purpose lifts the selected information carrier from its position, moves it towards the primary manipulator, to which the information carrier is transferred through the space left free in the magazine. The primary manipulator then brings the information carrier to the playing unit. These steps are carried out in reverse order for returning the information carrier after use.

Not only does this known device utilize the maximum storage capacity of the magazine only partly, because at least one column position must be left open therein at all times for the transfer of an information carrier from the one to the other manipulator, but the take-over of the information carrier between the two manipulators also leads to a loss of time and an additional risk of malfunctioning in the transport of the information carrier between its storage location and the playing unit.

SUMMARY OF THE INVENTION

There is a strong demand, especially in a computer environment, for a fast, efficient, and reliable access to the desired information carrier in the magazine. The invention has for its object inter alia to provide for this. A further object of the invention is to provide a device of the kind mentioned in the opening paragraph which has a large storage capacity.

According to the invention, a device for storing and selectively playing disc-shaped information carriers of the kind mentioned in the opening paragraph is for this purpose characterized in that the information carriers leave a central core of the magazine open, from which core the playing unit is directly accessible, and in that the transport means are present entirely in said core of the magazine. In contrast to the known device, the device according to the invention has a playing unit which is directly accessible from the core of the magazine. It is prevented thereby that the information carrier has to travel a long way between its storage location and the playing position and has to be transferred from a first to a next manipulator in the transport means, as in the known device, which benefits both the speed and the reliability of the transport. In addition, the space in the magazine around the centreline can be fully utilized for the storage of the information carriers, and it is no longer necessary to leave open a column, so that a considerable gain in storage capacity is achieved in comparison with the known device. An increased storage capacity in its turn leads to an increase in speed owing to the inherently smaller average transporting distance of the information carriers.

A special embodiment of the device according to the invention is characterized in that the transport means comprise a carriage which is provided on a guide positioned along a central axis of the magazine so as to be translatable at least in axial direction and to be rotatable, in that a central processing unit controls the rotation and axial displacement of the carriage at least during operation in accordance with a desired destination of this carriage, in that the body comprises at least a telescopically extendable arm which extends radially from the central axis and is provided at an end with a retaining member which is capable of cooperating with a selected information carrier and of achieving or breaking a temporary connection to the information carrier during this, and in that the playing unit is positioned such that an information carrier is received thereby in an orientation identical to that which it has in its storage location. The transport of the information carrier here is entirely concentrated on said axis and is formed solely by an axial translation along said axis and a rotation about it. This is not only attractive from a constructional point of view, but it also improves the transport speed and the reliability.

A preferred embodiment of the device according to the invention is characterized in that the transport means are designed to cooperate with a central hole in an information carrier. This embodiment is based on the recognition that the central point with the central opening in a CD-type information carrier is an exact quantity, and is accordingly more accurately defined, unlike, for example, the diameter or circumference thereof. This embodiment thus leads to an increased accuracy of the retaining member at the end of the arm.

The axial displacement and rotation themselves can be carried out in various ways. A special embodiment of the device according to the invention is characterized in that the carriage comprises an internal thread which is to cooperate with an external thread of a spindle which is arranged substantially along the centreline and on which the carriage is placed, in that the spindle has a controllable drive, and in that the carriage is provided with controllable means for fixing the carriage temporarily on the spindle. The rotation of the spindle here ensures the necessary axial displacement of the carriage as long as the latter is not fixed on the former, and achieves a rotation of the carriage the moment this fixation is realized. Both movements can thus be realized with a single transmission mechanism.

Preferably, the retaining member in the device according to the invention is constructed such that it is not only capable of removing a selected information carrier from its position, but that it also provides for a temporary storage of the information carrier during the transport thereof. The information carrier is sometimes laid on a separate table before transport in conventional devices of the kind mentioned in the opening paragraph. The time involved therein and the concomitant risk of malfunctioning are eliminated by the embodiment of the device according to the invention described here.

A further special embodiment of the device according to the invention is characterized in that the carriage comprises an at least substantially identical arm, which extends in radial direction from the centreline, on more than one side, for example on both sides. It is achieved in this manner not only that an information carrier which has just been played can be taken from the playing unit while a next information carrier is already available for being placed therein, but also that the maximum angle of rotation required for reaching the storage location of a selected information carrier is reduced, which further contributes to the speed of the device.

A further special embodiment of the device according to the invention for the storage and selective playing of disc-shaped information carriers is characterized in that the individual storage locations for the information carriers are arranged in layers in a regular circular pattern, in that the storage locations of odd layers lie at least substantially straight above one another, in that the storage locations of even layers lie at least substantially straight above one another, and in that the storage locations of odd layers are situated at least substantially centrally between those of the even layers. The information carrier must be accessible from above or below if it is to be gripped, for example, by its central hole, which requires a certain minimum interspacing between consecutive layers in the magazine. This embodiment is based on the recognition that the proposed mutually staggered stacking of the information carriers in the layers renders it possible to combine a sufficient interspacing with a minimum loss of storage space. An extremely high packing density of the information carriers is achievable as a result of this, which is an advantage not only on account of space saving, but also on account of a reduction in the average distance and thus in the transport time between the individual storage locations and the playing unit.

To ensure an adequate accessibility of the central hole of an information carrier in the storage location thereof, a further embodiment of the device according to the invention is characterized in that the magazine is built up from a number of flat segments with equidistant depressions provided in accordance with a circular arc for receiving therein the information carriers and in that a recess is provided in a segment each time at least substantially centrally between adjoining depressions, which recess extends at least up to the circular arc and is designed for receiving therein an end of the arm with the retaining member. The centre of an information carrier is always well accessible to the transport means from a higher or lower layer from such a recess.

A further embodiment of the device according to the invention is characterized in that each layer of the magazine comprises a number of individual segments which are mutually fixed, and more in particular that the segments of odd and even layers lie against one another and are each provided with one or several mutually corresponding bores for receiving therein continuous pins which fix the whole into a rigid assembly. This results in a particularly compact and rigid stacking of the segments with the information carriers stored therein, which can be taken in its entirety from the magazine, if so desired, and replaced with a different one.

BRIEF DESCRIPTION OF THE DRAWINGS

The invention will now be explained in more detail with reference to an embodiment and the accompanying drawing, in which.

DESCRIPTION OF THE PREFERRED EMBODIMENTS

Figure 1:
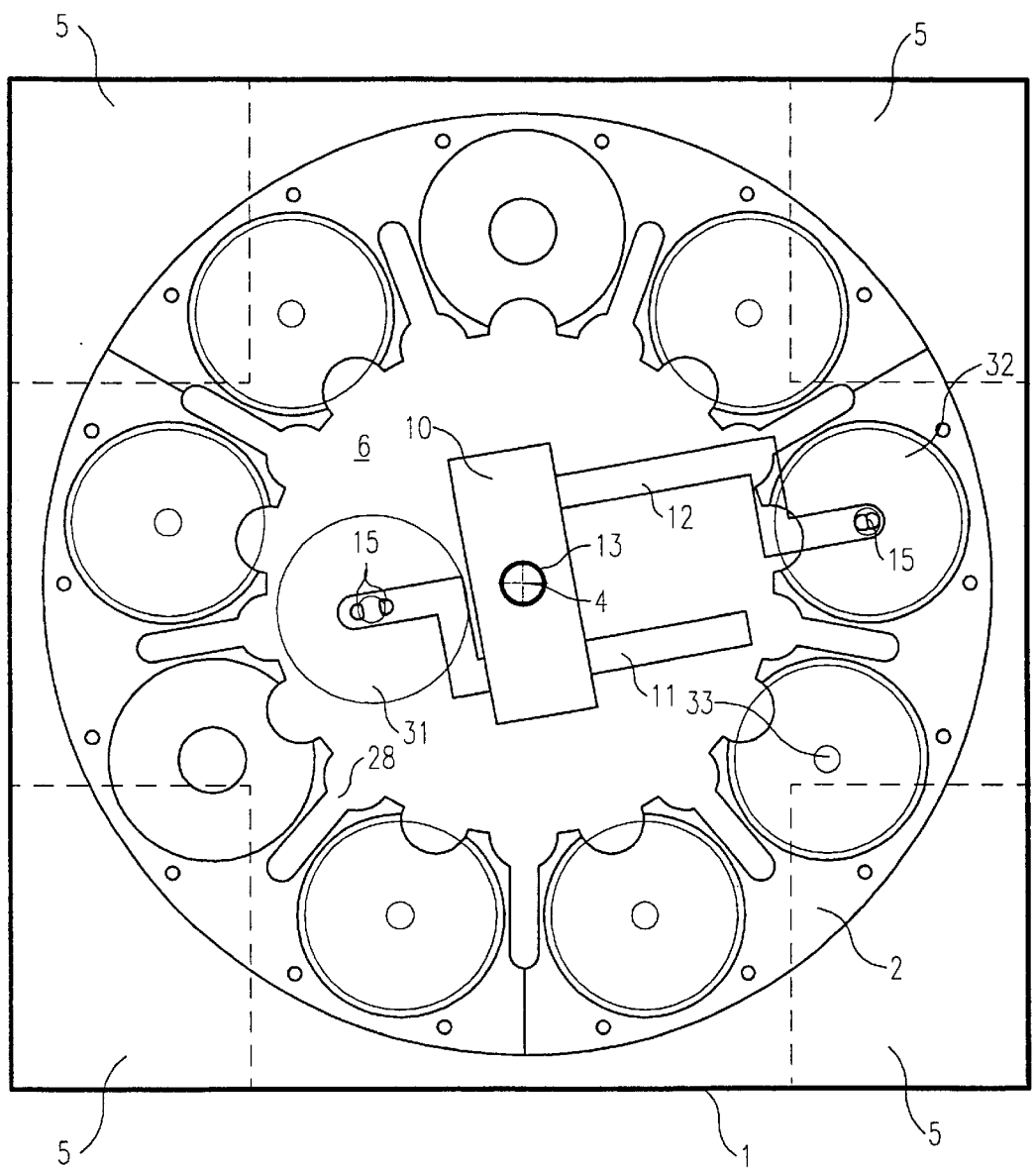
FIG. 1 is a cross-section through an embodiment of the device according to the invention.

The device of FIG. 1 comprises a rectangular housing 1 accommodating a magazine 2 in which information carriers 3, of the Compact Disc (CD) type in the present case, are arranged in layers around a virtual centreline 4. The housing further offers space to one or several playing units, CD reading and/or writing units, here shown in projection, which are placed above or below the magazine 2 and are accordingly directly accessible from a central core 6 left open by the information carriers 3.

Microprocessor-controlled transport means in the form of a carriage 10 with two radially extendable arms 11, 12, one on either side thereof, are also present in said core. The carriage is fastened such that it can be moved up and down along the centreline 4 and is rotatable, and can be accurately controlled as to these two movements. The carriage is for this purpose placed on a guide which here has the form of a central threaded spindle 13 which is driven in the bottom of the device and is in engagement with an internal thread in the carriage. An accurate control of the number of revolutions of this spindle ensures an exact vertical and rotational adjustment of the carriage in dependence on the desired destination thereof. The carriage 10 is provided with a controllable locking device (not shown) on the spindle. When this locking device is energized, the carriage is fixed on the spindle and will rotate along with the spindle, whereas in the non-energized state the carriage will slide axially over the spindle.

The carriage is capable of gripping or releasing a freely selectable CD with one of its arms and of displacing it between its individual, defined storage location and one of the two playing units. The two arms 11, 12 are for this purpose each provided with a retaining member 15 at their respective ends, which member is microprocessor-controlled and can grip into a central opening 33 of an information carrier for holding on to this information carrier (temporarily) or releasing it. The drawing shows a first information carrier 31 being held, the retaining member 15 at the same time offering a temporary storage facility for the information carrier during its transport, while the retaining member 15 is not (yet) in contact with the inner rim of the central opening of a second information carrier 32.

During operation, a selection of a certain information carrier is put in from an operational position, whereupon a central processing unit obtains the location of this carrier from a memory, which may or may not be volatile, and directs the carriage to the desired information carrier on the basis thereof. After the selected information carrier has been gripped by an arm 11, 12, it is held thereby and conducted to and into a playing unit. If the desired playing unit is not yet free, the information carrier present therein can first be taken out by means of the other arm. This previous information carrier is then returned to its storage location. Since the transport is effected in its entirety in the core of the magazine and consists merely of an axial translation along and a rotation of the carriage 10 about one and the same axis in combination with a radial displacement of its arms, the process can be carried out quickly, efficiently, and very reliably. The fact that the playing units receive the information carrier in the same orientation in which it is stored in its original position also contributes to this simplicity.

Figure 2:
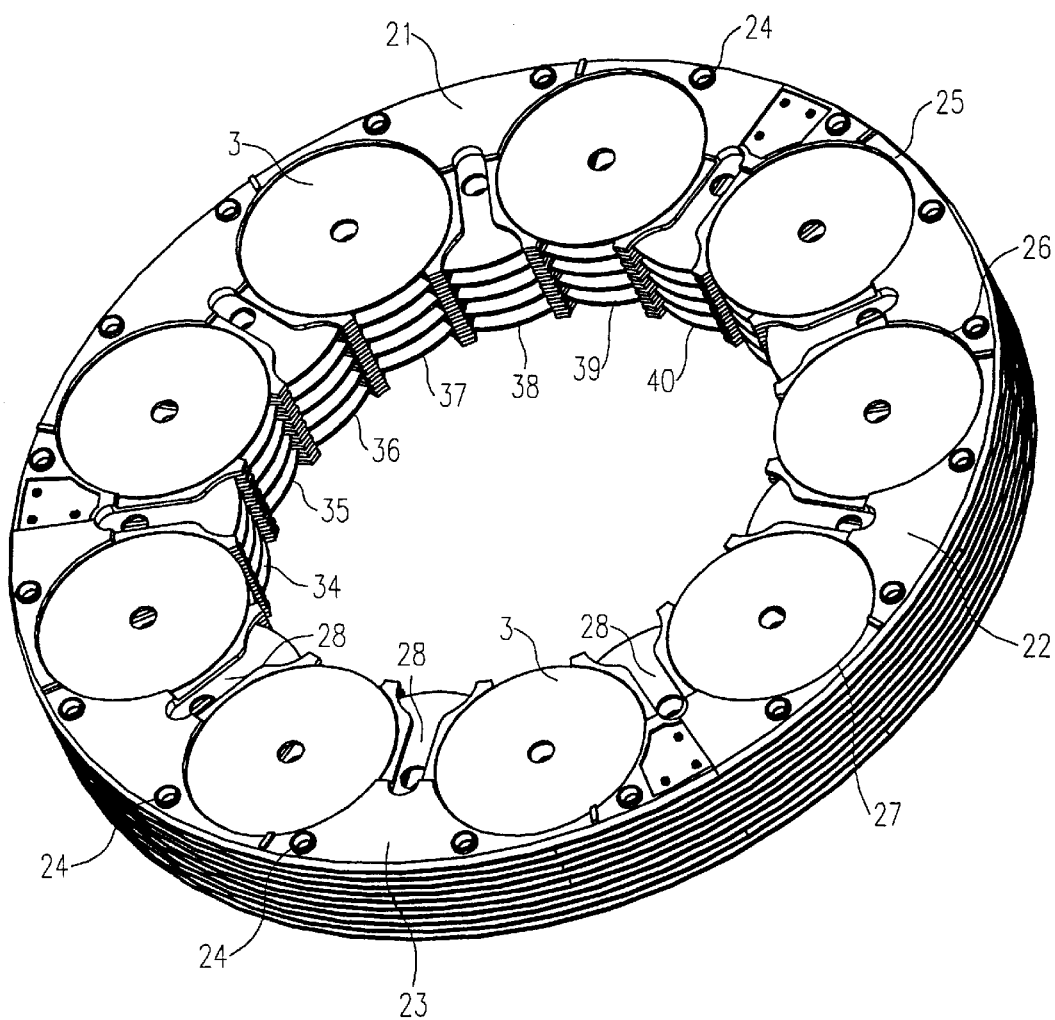
FIG. 2 shows a magazine for use in the device of FIG. 1 in perspective view The Figures are purely diagrammatic and not drawn true to scale. Some dimensions have been particularly exaggerated for greater clarity. Corresponding parts have been given the same, reference numerals as much as possible.

FIG. 2 shows the magazine 2 in more detail in perspective view. The magazine comprises a coherent stack of interconnected flat segments 21 . . . 23 arranged in layers in which the individual storage locations for the information carriers 3 are arranged in a regular circular pattern. Each segment 21 . . . 23 for this purpose comprises three equidistant depressions 25 . . . 27 arranged along a circular arc, so that a total of nine information carriers can be stored in a full circle in each layer. It is obvious that within the scope of the invention also a greater or smaller number of information carriers may be accommodated in each layer in that the diameter of the magazine is adapted accordingly. It is also alternatively possible for each layer to be formed by a single integral segment instead of three or more separate ones. The subdivision into separate segments, however, is advantageous for their manufacture because these segments are often made from a suitable synthetic resign by injection moulding.

The storage locations of the odd layers and those of the even layers are straight above one another each time, so that separate columns 34, 35, 36, 37, 38, 39, 40, . . . of information carriers can be distinguished. The columns 35, 37, 39, . . . formed by the storage locations of the odd layers are arranged substantially centrally between the columns 34, 36, 38, . . . formed by the information carriers of the even layers, so that the information carriers are distributed over the layers shifted by half their diameter each time. Such an arrangement creates additional space between the centres of vertically adjoining information carriers which is necessary for admitting the end of one of the two arms. The recesses 28, which are present each time between mutually adjoining depressions 25 . . . 27, and which accordingly lie exactly at the areas of the centres of the information carriers in the next higher and next lower layer, also strongly contribute to the accessibility of the centres of the tightly packed information carriers. Through such a recess, which extends at least up to the circular arc defined by the centres of the storage locations, the end of the arm 11, 12 has free access to the centre of the selected information carrier. An extremely high packing density can thus be realized which nevertheless allows for the information carriers to be gripped in their exactly defined centres.

In this example, the layers lie closely packed together and bores 24 are provided in the segments for receiving continuous pins or rods (not shown) which provide a fixation of the individual layers to one another. A particularly compact and rigid assembly is obtained thereby which can be taken in its entirety from the device or be placed therein, with a vertical pitch between the layers of 6.5 mm and a magazine circumference of 175 cm.

Although the invention was explained in detail above with reference to only this one embodiment, it will be obvious to all that the present invention is by no means limited thereto. On the contrary, many variations and designs will be possible to those skilled in the art without departing from the scope of the invention. In general, the invention points the way towards an extremely compact storage system for large numbers of information carriers which can be stored therein and can be retrieved fully automatically within a short period for being played.

What is claimed is:

1. A device for storing and selectively playing disc-shaped information carriers (3,31,32), comprising a magazine (2) for accommodating the information carriers in layers arranged around a virtual centerline (4), at least one playing unit (5) for receiving a selected information carrier, and controllable transport means (10–15) for holding or releasing the selected information carrier (31,32) and transporting it between an individual storage location and the playing unit, in which the magazine leaves a central core (6) of the magazine open, the playing unit (5) is directly accessible from said core, and in which the transport means reside entirely within said core, at least during axial transport of the selected information carrier, wherein the magazine comprises individual storage locations (25–27) for the information carriers (3) which are arranged in layers in a regular circular pattern, the storage locations (35,37,39) of odd layers lie at least substantially straight above one another, the storage locations (34,36,38,40) of even layers lie at least substantially straight above one another, and the storage locations of odd layers are situated at least substantially in between those of the even layers.

2. The device as claimed in claim 1, wherein the magazine further comprises a number of flat segments (21–23) with equidistant depressions (25–27) provided in accordance with a circular arc for receiving therein the information carriers, and in that a recess (28) is provided in the segments at least substantially centrally between adjoining depressions, said recess extending at least up to the circular arc.

3. The device as claimed in claim 2, wherein successive said segments lie against one another and are each provided with one or several mutually corresponding bores (24) for receiving therein continuous pins which fix the device into a rigid assembly.

4. The device as claimed in claim 3, wherein each magazine layer has a useful diameter of approximately 1650 cm and offers space therein for nine information carriers of CD format, and the segments are approximately 6.5 mm thick.

5. A magazine for storing disc-shaped information carriers, comprising:

individual storage locations for storing the information carriers, the individual storage locations being arranged in layers in a regular circular pattern, the storage locations of odd layers lying at least substantially straight above one another, the storage locations of even layers lying at least substantially straight above one another, and the storage locations of odd layers being situated at least substantially in between those of the even layers, the individual storage locations being arranged around a virtual centerline of an opening in the magazine that is adapted to receive a device that transports the information carriers to a playing unit.

6. A device for storing and selectively playing disc-shaped information carriers (3,31,32), comprising a magazine (2) for accommodating the information carriers in layers arranged around a virtual centerline (4), at least one playing unit (5) for receiving a selected information carrier, and comprising controllable transport means (10–15) for holding or releasing the selected information carrier (31,32) and transporting it between an individual storage location and the playing unit, wherein the magazine leaves a central core (6) of the magazine open and the playing unit (5) is directly accessible from said core, wherein the transport means comprise a guide (13) positioned along the virtual centerline and a carriage (10) on said guide (13) which is translatable at least in an axial direction and rotatable on said guide, the carriage residing entirely within said core, at least during axial transport of the selected information carrier, wherein the transport means are disposed between the playing unit and the magazine, wherein a central processing unit controls the rotation and axial displacement of the carriage at least during operation in accordance with a desired destination of the carriage, wherein the carriage comprises at least one extendable arm (11,12) which extents radially from the virtual centerline and is provided at a free end with a retaining member (15) which is capable of cooperating with a central hole (33) of the selected information carrier in order to establish or break a temporary connection to the information carrier, and wherein the retaining member holds the information carrier during the transport thereof, thus providing for temporary storage of the information carrier.

7. The device as claimed in claim 6, wherein the carriage (10) comprises two at least of the extendable arms (11,12) which extend in a radial direction from the centerline on more than one side of the carriage.

\* \* \* \* \*